G. R. GUILD.
TRAIN CONTROLLING AND STOPPING SYSTEM.
APPLICATION FILED JUNE 2, 1913.
1,106,092.
Patented Aug. 4, 1914.
5 SHEETS—SHEET 2.
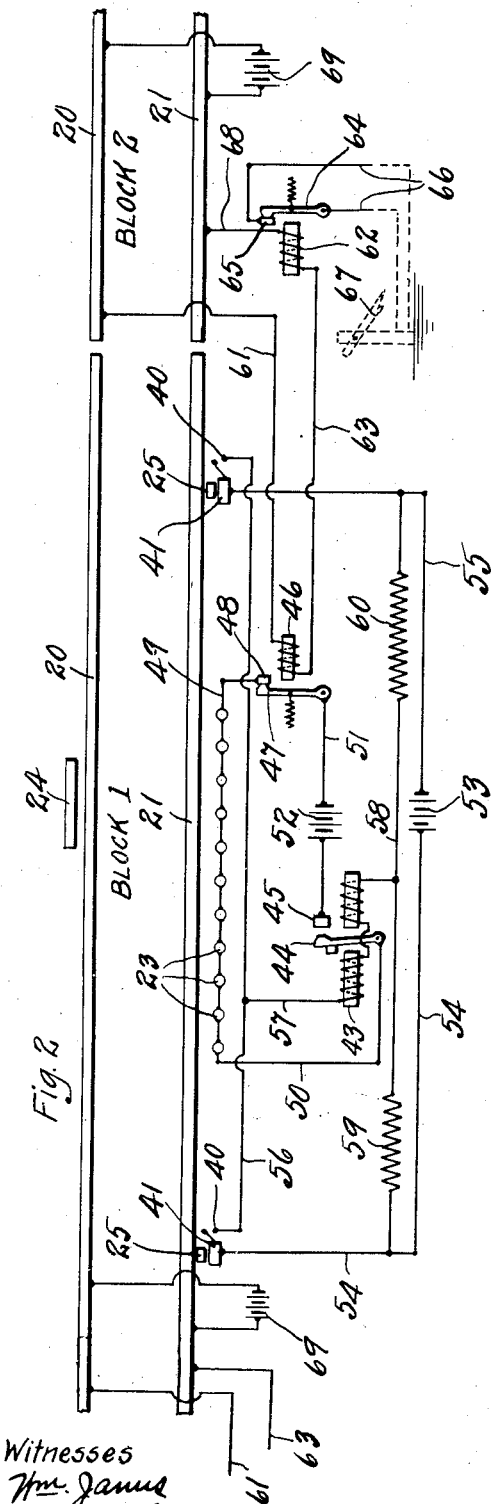
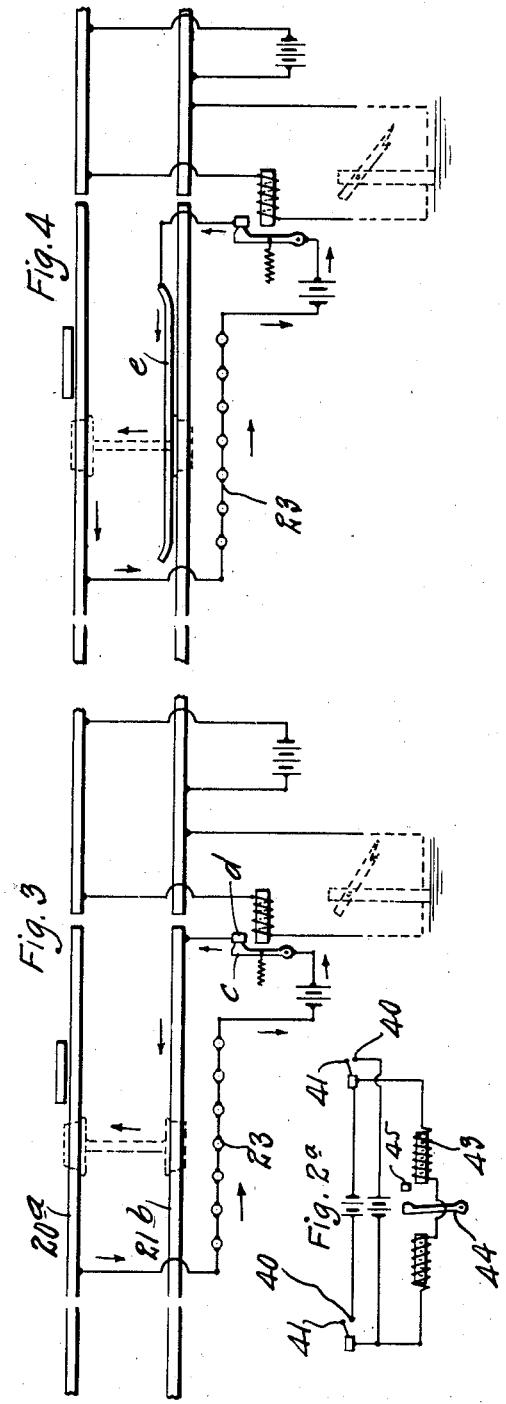
Witnesses
Inventor
George R. Guild
By _____, Atty G. R. GUILD.
TRAIN CONTROLLING AND STOPPING SYSTEM.
APPLICATION FILED JUNE 2, 1913.
1,106,092.
Patented Aug. 4, 1914.
5 SHEETS—SHEET 3.
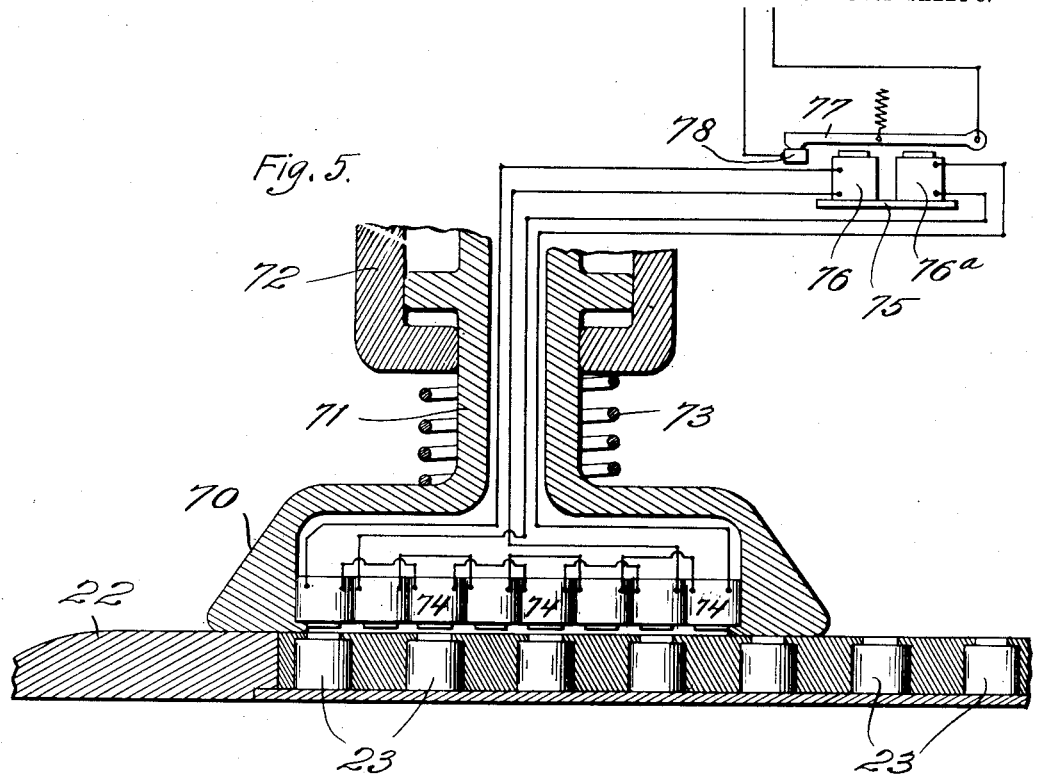
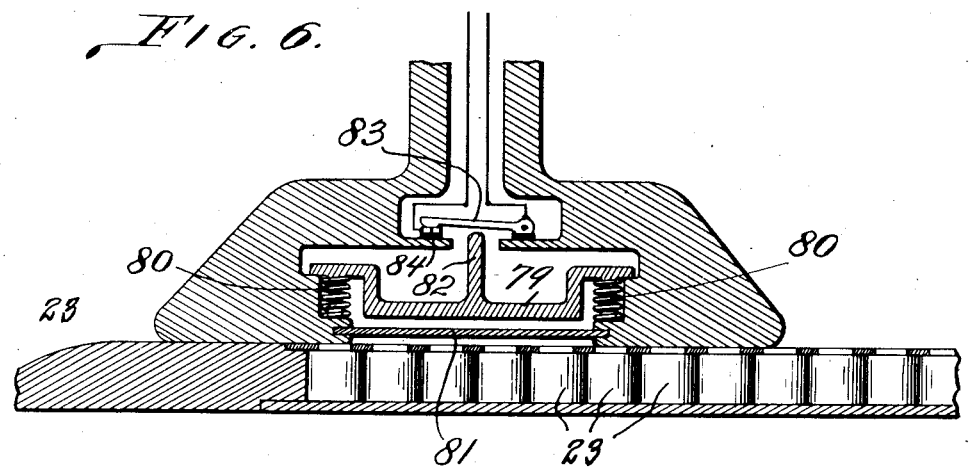
Witnesses
Inventor
George R. Guild G. R. GUILD.
TRAIN CONTROLLING AND STOPPING SYSTEM.
APPLICATION FILED JUNE 2, 1913.

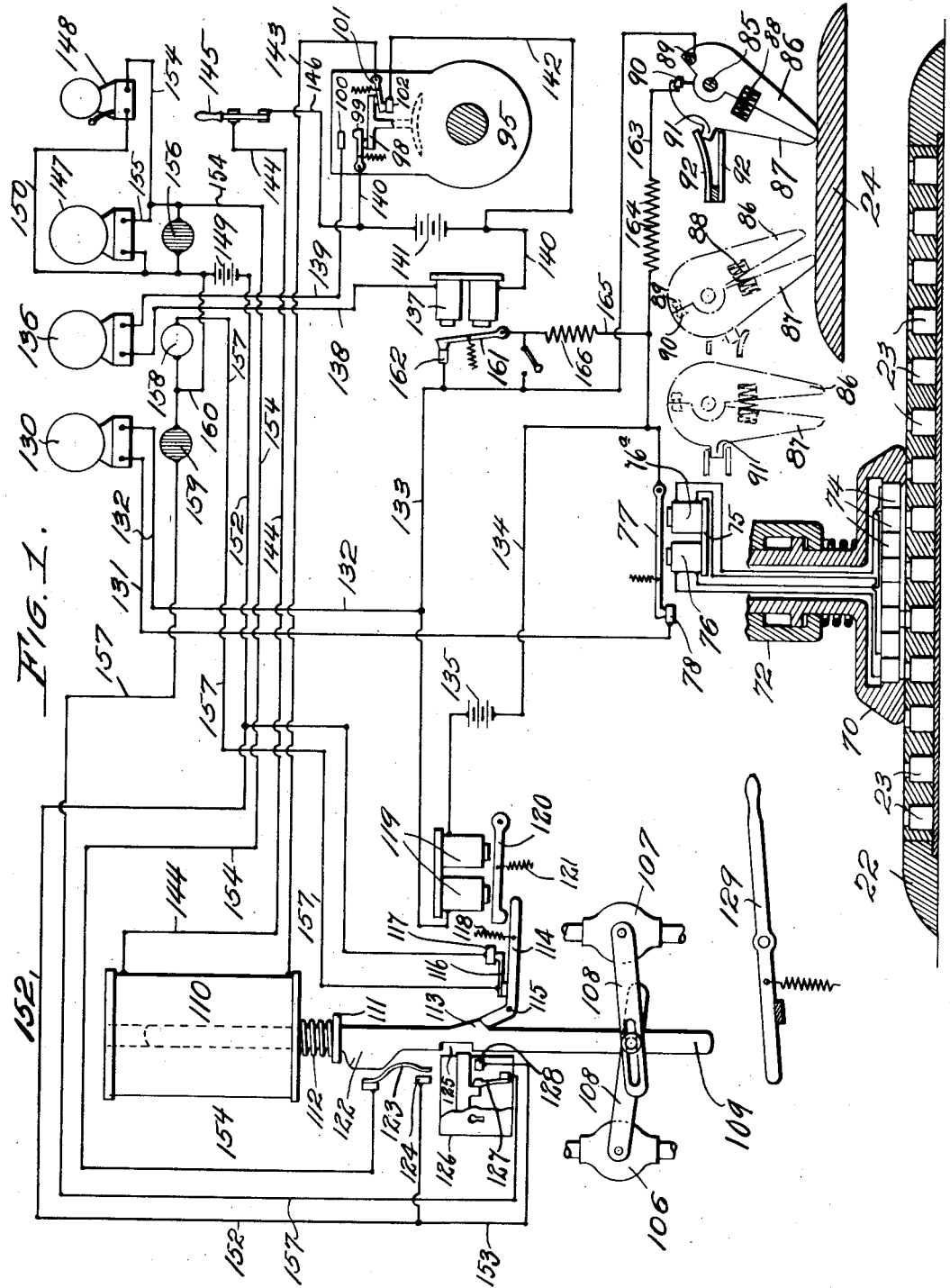

1,106,092.

Patented Aug. 4, 1914.
5 SHEETS—SHEET 4.

Witnesses
Wm Janne
W.U. Smith

Inventor
George R. Guild
By F. R. Cornwell, Atty.

G. R. GUILD.
TRAIN CONTROLLING AND STOPPING SYSTEM.
APPLICATION FILED JUNE 2, 1913.

1,106,092.

Patented Aug. 4, 1914.

5 SHEETS—SHEET 5.

Witnesses

Inventor
George R. Guild
By _____ Atty.

UNITED STATES PATENT OFFICE.

GEORGE R. GUILD, OF FORT BAYARD, NEW MEXICO, ASSIGNOR OF ONE-HALF TO W. J. BROWNE, OF FORT BAYARD, NEW MEXICO.

TRAIN CONTROLLING AND STOPPING SYSTEM.

1,106,092.  Specification of Letters Patent.  Patented Aug. 4, 1914.

Application filed June 2, 1913. Serial No. 771,237.

*To all whom it may concern:*

Be it known that I, GEORGE R. GUILD, an officer of the United States Army, stationed at Fort Bayard, New Mexico, have invented a certain new and useful Improvement in Train Controlling and Stopping Systems, of which the following is a full, clear, and exact description, such as will enable others skilled in the art to which it appertains to make and use the same, reference being had to the accompanying drawings, forming part of this specification, in which—

Figure 7:
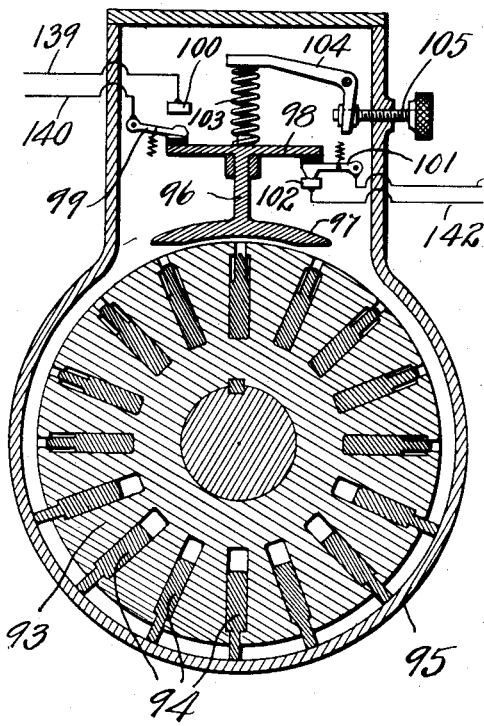
Figure 8:
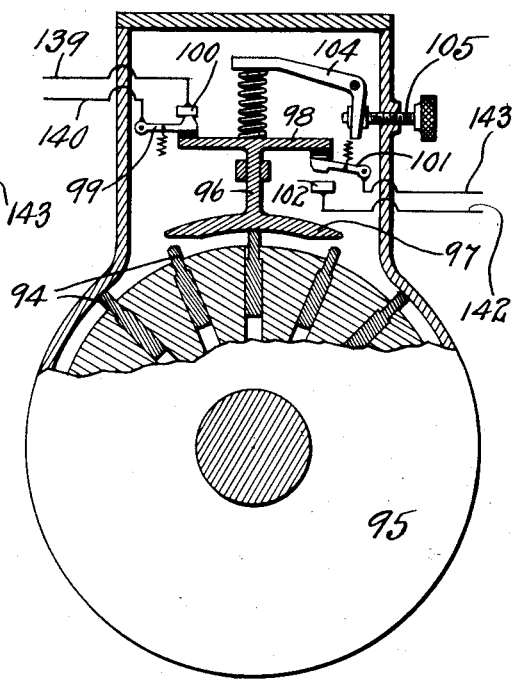
Figure 9:
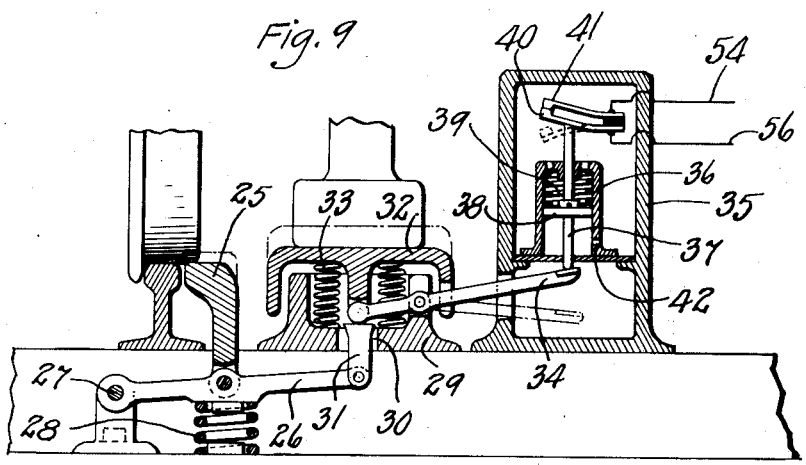

Figure 1 is a diagrammatic view showing various mechanical and electrical devices forming a part of my improved system, and which devices are carried by the locomotive. Fig. 2 is a diagrammatic view of a portion of a track, the same being equipped and wired as contemplated by my invention. Fig. 2ᵃ is a diagrammatic view of a modified form of the track wiring and showing a polarized relay using two sets of batteries but no resistances. Figs. 3 and 4 are diagrammatic views of modified forms of the means utilized for making and breaking circuit through the track magnets at the proper time. Fig. 5 is a vertical sectional view taken through the center of a trough or rail section in which is arranged a series of track magnets, and also showing a coil carrying shoe which passes over said trough or rail section for the purpose of setting up an induced current through said coils and which current is essential in the operation of my improved system. Fig. 6 is a vertical sectional view similar to Fig. 5 and showing a modified form of the shoe which rides over the track magnets. Fig. 7 is a vertical sectional view of the speed control device forming a part of my improved system, and which device is preferably located on one of the axles of the engine. Fig. 8 is a view similar to Fig. 7 and showing the position of parts of the speed control device when in action under high speed. Fig. 9 is a cross sectional view of certain contact housings and contact actuating devices which are arranged adjacent to one of the track rails near the ends of the trough or rail section containing the track magnets. Figs. 10 to 17 inclusive are diagrammatic views of certain of the circuits of my improved system, and in these illustrations the circuits shown in solid lines indicate the circuits which are active under certain conditions.

My invention relates to a train controlling and stopping system wherein certain electrical and mechanical devices arranged adjacent to the track and upon a locomotive are utilized in conjunction for preventing an engine from being driven past a semaphore which is set at danger, the stopping action being brought about by the automatic shutting off of the steam on the locomotive and simultaneously, the setting of the air brakes.

The principal object of my invention is to provide a comparatively simple system for controlling the speed of a locomotive and controlling the passage thereof beyond a semaphore set at danger, which system can be easily and cheaply installed, which conforms to the required standards of clearance of rolling stock and track structure, and which system is equipped with certain devices whereby the actions or operations of the system are permanently recorded and also called to the attention of the engineer by means of visible and audible signals.

In the drawings, and in the following description, I have shown and described my improved system as utilized in connection with semaphores arranged adjacent to the track, but my improved system may be used as an interior cab block system complete by omitting the track semaphores and their controlling relays.

With the above and other objects in view, my invention consists in certain novel features of construction and arrangement of parts hereinafter more fully described and claimed.

The railway track with which my improved system is combined is divided into blocks of suitable length, and in Fig. 2, I have shown the right hand end of a block designated 1 and an adjacent portion of the track of block 2 and its semaphore. A set of the track magnets and connections about to be described are located near each end of each block, one set being adapted to operate the semaphores as the train moves in one direction, and the opposite set being adapted to move the semaphores as the train moves in the reverse direction. The parts shown in Fig. 2 are adapted to be operated as a locomotive moves from block 1 toward and on to block 2. In Fig. 2, the track rails are designated by the numerals 20 and 21 and adjacent to the rail 21 is a short rail or trough 22 containing a series of magnets 23 connected in series or in parallel or in multiple series as desired. Arranged directly opposite these track magnets and adjacent to the rail 20 is a short rail 24 which is adapted to be engaged by a jaw lever that is carried by the locomotive and which is hereinafter more fully described. Located adjacent to the track rail 21 and near the ends of the rail or trough 22 are contact make and break devices each comprising a block 25 which normally occupies an elevated position with respect to the adjacent track rail as shown by dotted lines in Fig. 9 and this block is adapted to be depressed by the wheel of a passing locomotive. The lower end of the block is pivotally connected to a lever 26, fulcrumed at 27, and normally held elevated by a comparatively stiff compression spring 28. Located immediately adjacent each block 25 is a plate 29 provided with an aperture 30 through which operates a leg 31, the same being pivotally connected to the lever 26. Arranged above the plate 29 is a second plate 32 which is adapted to be engaged and depressed by a shoe which is carried by the engine and hereinafter more fully described, said plate being normally maintained in an elevated position by means of spring 28 and by compression springs 33 which are comparatively lighter or weaker than the spring 28. Fulcrumed to the plate 29 is a lever 34, one end of which is interposed between a stem depending from the center of the plate 32 and the upper end of the leg 31. Located immediately adjacent each plate 29 is a housing 35 and positioned therein is a cylinder 36 through which operates a piston rod 37, the same carrying a piston 38, and arranged on top of said piston within the cylinder is a compression spring 39. The lower end of the piston rod 37 bears on the outer end of the lever 34, and the upper end of said piston rod normally bears against the underside of a contact spring 40 which is adapted to engage with a corresponding contact spring 41. The upper end of the cylinder 36 is open so that the piston 38 can move upward quickly, but said piston moves downward under the influence of the spring 39 slowly by reason of the air confined in the cylinder below the piston and which air escapes through a comparatively small aperture 42 formed in the lower portion of said cylinder. This construction provides for maintaining the contacts 40 and 41 in engagement with each other for an appreciable length of time in order to enable a polarized relay which is in circuit with said contacts to act. Spring 28 can only be depressed or overcome by an exceptionally heavy weight, such as a locomotive or car wheel engaging the block 25 and thus the parts 35 and 32 will be held in their normal elevated positions and they will not be affected by any normal weight, as for instance the weight of a person stepping on the plate 32.

43 designates a polarized relay and 44 the armature thereof, the same being adapted to contact with a point 45.

46 designates an ordinary relay magnet the armature 47 of which is adapted to make contact with a point 48. The contact point 48 is electrically connected to the track magnets 23 by means of a conductor 49 and the armature 44 of the polarized relay connected to said magnets by a conductor 50. Connecting the contact point 45 with the armature 47 is a conductor 51 in which is located a battery 52. Leading from one of the contact springs 41 to one side of a battery 53 is a conductor 54, and leading from the opposite side of this battery to the opposite one of said contact springs 41 is a conductor 55. Connecting the contact springs 40 is a conductor 56, and connecting the same with one of the coils of the polarized relay 43 is a conductor 57. The opposite one of the coils of the polarized relay is connected to a conductor 58 in which is located resistances 59 and 60, the same being on opposite sides of the connection to the polarized relay and having considerably more resistance than said polarized relay. The track rail 20 of block 2 is connected to relay magnet 46 by a conductor 61, and leading from said relay magnet to another relay magnet 62 located adjacent to the end of block 2 of the track is a conductor 63. The armature 64 of magnet 62 is adapted to make contact with a point 65, and connected to said armature and contact point are conductors 66 which lead to the electrically operating mechanism of a semaphore 67. This semaphore is of the ordinary construction which is released electrically and pulled upward into a horizontal position by means of a counterweight to indicate "danger". The semaphore and its electrical connections with the track rails are of ordinary well known construction and form no part of my invention.

Connecting the magnet 62 with the rail 21 of block 2 is a conductor 68. Located in each block is a battery 69, the same being electrically connected to the track rails 20 and 21.

In Fig. 2$^a$ I have shown a circuit for the polarized relay 43 using two sets of batteries but no resistances. In this arrangement, one set of batteries does not discharge current except during the time when either pair of the contacts 40 and 41 are closed. In the arrangement shown in Fig. 2, battery 53 is at all times discharging current through the resistances 59 and 60.

In Figs. 3 and 4 I have shown modified arrangements for establishing and breaking a current through the track magnets at the proper time. In Fig. 3, 20ª and 21ᵇ designate an insulated portion of the track and when the wheels and axles of a locomotive bridge these particular portions of the track as shown by dotted lines in Fig. 3, the current will take the path indicated by arrows and the magnets 23 will be energized if the contacts c and d are closed. In Fig. 4, the flange of one of the wheels establishes connection with a short rail section e and a circuit is set up through the various parts as shown by arrows in Fig. 4.

The shoe which passes over the trough or short rail section 22 and which is adapted to depress the plate 32, is shown in section in Fig. 5 and comprises a main body 70 with which is formed integrally a tubular stem 71, the latter being mounted for vertical movement in a bearing 72 and which latter is attached to a fixed part of the locomotive frame.

Interposed between the bearing 72 and the shoe 70 is an expansive spring 73 which normally forces said shoe downward. The shoe 70 is hollow, and positioned therein is a series of coils 74 of wire wound on soft iron cores. The coils 74 are arranged immediately adjacent each other while the magnets 23 in the trough or rail 22 are placed apart so that when the shoe is positioned above the rail or trough 22, the coils will occupy positions relative to the magnets 23 as shown in Fig. 5. The odd numbered coils within the shoe are connected in series with each other and with coil 76 of a relay 75, the same being located at a suitable point in the locomotive cab. The even numbered coils within the shoe are connected in series and also in series with coils 76ª of the relay 75. The armature 77 of relay 75 is normally held away from its coils by a retractile spring and this armature is adapted to contact with the point 78.

In Fig. 6, I have shown a modified form of the shoe and in this construction a soft metal plate 79 is arranged in the underside of the shoe, said plate being normally elevated by means of compression springs 80 located beneath its ends. A plate 81 of suitable non-magnetic substance, such as wood, rubber or glass, is located beneath the plate 79 for the purpose of keeping out dirt, snow and water. The plate 79 carries a centrally arranged stem 82 which normally bears against a contact arm 83, the same being adapted to make contact with a point 84. These contact points 83 and 84 correspond to the contact points 77 and 78. On the opposite side of the locomotive from the shoe 70 is a short horizontally disposed shaft or trunnion 85 and journaled thereon is a lever comprising a pair of mating jaws 86 and 87, the same normally occupying a vertical position as shown by dotted lines in Fig. 1 and being normally forced apart by an expansive coil spring 88. The upper end of jaw 86 carries a contact point 89 while the opposite jaw carries a contact point 90, the same being normally in engagement with each other. Formed on the side of the jaw 87 is a lug 91, the same occupying a position between the free ends of a pair of flat springs 92, which latter are attached to a fixed part of the locomotive frame. Assuming that the locomotive to which this lever is attached is moving toward the right, then said lever will, upon engagement with the short rail section 24, assume the position seen in solid lines in Fig. 1, thereby closing the jaws, opening contacts 89 and 90 and causing the lug 91 to bear against the upper one of the flat springs 92, said springs being substantially stronger than the spring 88. Should the locomotive back up after passing the rail section 24, the lever comprising the jaws 86 and 87 will be moved into a reverse position as shown by dotted lines over the left hand portion of the rail section 24 in Fig. 1, thereby overcoming the resistance offered by the lower one of the flat springs 92 and permitting the spring 88 to force the jaws apart, consequently making contact between the parts 89 and 90.

The automatic speed control device forming a part of my improved system is illustrated in Figs. 7 and 8 and is constructed as follows: A hub 93 is fixed on one of the axles of the locomotive, said hub being radially slotted, and operating freely through the radial slots are plates 94. The hub 93 is inclosed by a suitable housing 95 which extends upward to inclose certain contact points forming a part of the automatic speed control. Arranged for vertical movement within the housing 95 above the hub is a stem 96 carrying on its lower end a curved plate 97, and on its upper end a horizontally disposed plate 98. One end of a pivotally mounted spring-held contact arm 99 rests on one side of the plate 98, said contact arm being adapted to make contact with a point 100. The free end of a pivotally mounted spring-held contact arm 101 bears against the underside of the plate 98 and is adapted to make contact with a point 102. A spring 103 normally bears downward upon the plate 98, said spring being engaged by one end of a bell crank 104, the short arm of which is engaged by a thumb screw 105 which can be manipulated to shift the position of the bell crank and consequently regulate the tension of the spring 103.

Under normal conditions, and while the locomotive is running at a low or moderate speed, the plates 94 passing beneath the curved plate 97 maintain their positions within the slots in the hub, and thus the curved plate 97, stem 96 and plate 98 maintain their normal positions with the contacts 101 and 102 closed and contacts 99 and 100 open. While the locomotive is running at low speed, the pressure on the under face of plate 97 due to centrifugal force is not sufficient to raise said plate. the stem 96 and plate 98.

When the locomotive is operating at high or abnormal speed, the plates 94 are thrown outward by centrifugal force as shown in Fig. 8, thereby striking against and elevating the curved plate 97, consequently overcoming the resistance offered by spring 103 and moving the stem 96 and plate 98 upward, which movement opens contacts 101 and 102 and closes contacts 99 and 100.

The plunger for operating the air and steam valves will now be described.

106 designates the air valve and 107 the steam valve, and connected to the stems of these valves are slotted levers 108 which overlie each other and which are operatively connected to a plunger in the form of a rod 109. The upper end of this plunger forms the core of a solenoid coil 110. Located on the plunger is a collar 111, and interposed between said collar and the underside of the solenoid coil is a compression spring 112. This spring is for the purpose of quickly moving the plunger downward when the same has been released. Formed on the plunger 109 is a lug 113, which, when said plunger is elevated, is engaged by the upwardly turned end of a latch 114, which latch is pivoted at 115 and carries a contact arm 116 which is adapted to make contact with a point 117. This latch is normally held elevated by a retractile coil spring 118.

119 designates a magnet, the armature 120 of which when released and pulled downward under the influence of a spring 121 is adapted to strike against the outer end of the latch 114 and move the same upon its pivot point to free the upturned end of said latch from the lug 113. Formed on the plunger 109 is a lug 122, which, when the plunger moves downward is adapted to engage a contact spring 123 and force the same into contact with a point 124. Formed in the side of the plunger 109 is a notch 125 which is adapted to be engaged by the bolt of a key-operated lock 126, thus making it possible to lock the plunger in its elevated position. The bolt of this lock when moved forward to engage the plunger bears upon a contact spring 127 and forces the same into contact with a point 128. Fulcrumed a short distance below the plunger 109 is a hand lever 129 which can be manually actuated to raise the plunger 109 to its normal position.

Located at a suitable point within the locomotive cab is an electrically operated device 130 which is adapted to record and register each time the shoe 70 passes over one of the short rails or troughs 22 containing a series of track magnets. A conductor 131 leads from this recorder to the contact points 78, and a conductor 132 leads from said recorder to a conductor 133, which latter connects one of the magnet coils 119 with the contact point 89. Leading from the opposite coil of the magnet 119 is a conductor 134 which is connected to the armature 77, and located in this conductor is a battery 135. Located adjacent to the recording device 130 is an electrically operated indicator 136 which is for the purpose of indicating the speed at which the locomotive is traveling and to show the engineer whether or not his speed is sufficiently low to permit him to pass a block which is set against him. Leading from one of the binding posts of this speed indicator to one of the coils of a magnet 137 is a conductor 138. A conductor 139 leads from the opposite binding post of the speed indicator to the contact point 100. Leading from the contact arm 99 to the opposite pole of the battery 141 is a conductor 140 in which is located a battery 141. A conductor 142 leads from the contact point 102 to the conductor 140 on one side of the battery 141 and a conductor 143 leads from the contact lever 101 to the solenoid coil 110. A conductor 144 leads from the opposite end of this solenoid coil to one of the contact points of a hand switch 145 and from the other point of this switch a conductor 146 leads and connects to the conductor 140 on the opposite side of the battery 141 from the conductor 142. An electrically operated recording device 147 is arranged adjacent to the recorder 130 and the indicator 136 and is for the purpose of recording each time the plunger 109 falls, and located adjacent thereto is a bell 148 which rings each time said plunger falls. Leading from a battery 149 to one of the binding posts of the bell 148 is a conductor 150 and leading therefrom to one side of the recorder 147 is a branch conductor 151. Leading from the opposite side of the battery 149 to the contact 124 is a conductor 152 and leading from this conductor to the contact point 128 is a branch conductor 153. Leading from the contact arm 123 to one of the binding posts of the bell is a conductor 154 and leading therefrom to one of the binding posts of the recorder 147 is a branch conductor 155. Electrically connected to the conductors 150 and 154 adjacent to the recorder 147 is an indicator 156 preferably in the form of a red lamp which is lighted whenever the plunger 109 drops. Leading from the contact arm 116 is a conductor 157 which leads to the contact point 127 in the lock 126. Electrically connected to this conductor 157 is an indicator 158 preferably in the form of a white electric lamp which is lighted while everything is "safe" and the system is in proper operative condition. Electrically connected to the conductor 157 adjacent to the recorder 130 is an indicator 159 preferably in the form of a red lamp which is lighted whenever the contacts 127 and 128 are closed, thus showing that the bolt of the lock 126 is moved into position to lock the plunger 109 against movement.

Leading from the conductor 157 between the lamps 158 and 159 is a branch conductor 160 which is connected to the conductor 150 near the battery 149. The magnet 137 is provided with a spring-held armature 161 which is adapted to make contact with a point 162, the same being electrically connected to the conductor 133 which leads from the magnet 119 to the contact point 89. Leading from the contact point 90 on the jaw 87 to the conductor 134 is a conductor 163 in which is located a resistance 164, and leading from this conductor to the armature 161 is a conductor 165 in which is located a resistance 166. These resistances are approximately equal to one another and to the resistance of recorder 130 in order to provide approximately equal resistances for the current from battery 135, the circuits being all in multiple.

Assuming that a train is upon and passing over block 1 from the left to the right hand in Fig. 2 and that there is no train on block 2. Current from battery 69 discharges through rail 20 of block 2 and conductor 61 to relay 46, thence back through conductor 63, relay 62, conductor 65 and rail 21 of block 2 back to the battery 69. This current flow attracts the aramtures 47 and 64, thereby holding armature 47 in contact with point 48 and establishing circuit through the conductor 66 which leads to the actuating mechanism of the semaphore 67, thereby drawing the same downward to indicate "safety". Thus by the position of the arm of the semaphore 67, the engineer on the train on block 1 knows that it is safe to proceed on to block 2. Relay 46 in conjunction with polarized relay 43 controls the flow of current to the track magnets 23. If there should be a train on block 2 then battery 69 will be short-circuited by the wheels and axles of this train and relays 46 and 62 will release their respective armatures. Armature 64 upon being released opens the circuit through conductor 66, thereby permitting the counter-balancing weight in the semaphore 67 to elevate the arm to indicate "danger". Armature 47 on being released opens the circuit through the track magnets 23 of block 1 and consequently, under the conditions, there will be no induced current in the magnets 74 carried by the shoe, as the same passes over the track magnets 23.

In order that current may flow from battery 52 to the track magnets 23 contacts 44 and 45 and 47 and 48 must be closed. Contacts 44 and 45 are closed as follows: It will be understood that a polarized relay responds to direction of current through its coils, hence the closing of contacts 40 and 41 by the shoe passing over and depressing plate 32, which is in front of the track magnets of block 1, permits the current from battery 53 to flow from the positive pole through conductor 54 to contact arm 41; thence through contact arm 40, conductors 56 and 57 and from left to right through polarized relay 43, thereby closing contacts 44 and 45; from thence through conductor 58 through resistance 60 and back through conductor 55 to the opposite side of the battery 53. During this action some current flows through resistance 59 but this will be negligible as compared to the current through the polarized relay. Contacts 44 and 45 and 47 and 48 being now closed, the current flows from battery 52 through conductors 51 and 49 and through the track magnets and will continue to do so until one of the sets of contacts is opened. Contacts 47 and 48 may be opened by a locomotive running on to block 2 but contacts 44 and 45 cannot be opened except by closing the contacts 40 and 41 within the housing 35 which is located adjacent the right hand end of the track batteries.

While the track magnets are energized, the passage of the shoe 70 over said magnets will cause an induced alternating current to be set up in the coils 74 carried by the shoe and through the circuits connected to said coils, if said circuits be closed, as is the case in my improved construction. This induced current follows the same laws of current flow as in dynamos, as the odd numbered coils in the shoe come into position above the magnets as shown in Fig. 5, the maximum change of magnetic flux is occurring through the cores of these coils and the current generated in them will be at maximum. At this same instant the even numbered coils will have a minimum of change of magnetic flux and no current will be in them. This condition changes with the passage of the shoe over the track magnets, the current at one time flowing in the odd numbered coils rising to a maximum therein as the current in the even numbered coils falls to minimum. The current, of course, changes direction but as long as there is any current at all flowing through relay magnet 75, its armature 77 will be attracted irrespective of the direction of this current, for the reason that the coils of this relay are not connected electrically and either coil alone is sufficient to hold the armature closed when desired. The currents generated in the two sets of coils during the passage of the shoe over the track magnets are approximately 90° out of phase with one another; hence, relay 75 is never without current as the shoe passes over the track magnets while the latter are energized and armature 77 makes contact with the point 78 while said shoe is passing over the track magnets.

When the modified form of the shoe, as shown in Fig. 6, is used, the springs 80 normally maintain the plate 79 elevated thereby holding the contacts 83 and 84 open and when the shoe passes over the track magnets the plate 79 is attracted, thereby permitting the contacts 83 and 84 to close. Thus contacts 77 and 78 are closed. As the locomotive continues toward the right hand end of block 1, the lever comprising the jaws 86 and 87 will strike against and ride over the short rail section 24, whereupon said lever will be turned from its normal vertical position into the inclined position seen in solid lines in Fig. 1 and the upper one of the springs 92 acting upon the lug 91 will close the jaw 87 against the jaw 86, thereby opening contacts 89 and 90. Unless contacts 77 and 78 are maintained or unless the speed controller permits contacts 161 and 162 to close, there will be no current in the engine magnet 119 and the armature 120 thereof will actuate the trip 114 to permit the plunger 109 to drop. Thus, it will be seen that when the engine is opposite the short rail section 24 and running at normal speed, the signal devices and brakes are held at their safe positions by reason of the contacts 77 and 78 being closed. As soon as lever comprising the jaws 86 and 87 passes off the short rail section 24, the upper one of the springs 92 will restore said lever to its normal vertical position and the spring 88 will separate the jaws which brings about the engagement of the contacts 89 and 90. This action relieves the coils 74 from further responsibility of holding the signals at safe and the shoe may pass off the trough 22 and the track magnets therein, thereby breaking the circuit to the relay 75 and permitting the contacts 77 and 78 to open. The engine now passes over the block 25 located to the right hand of the series of track magnets, and as said block is depressed by one of the locomotive wheels, the levers 26 and 35 will be actuated to close the contacts 40 and 41, thereby permitting the current to flow from battery 53 through conductor 54, from thence through resistance 59; thence through polarized relay from right to left, open contacts 44 and 45; from thence through conductor 57 to and through conductor 56; through closed contacts 40 and 41; from thence through conductor 55, back to battery 53. During this action a small amount of current flows through resistance 60, but, due to its excess of resistance over the resistance of the polarized relay, said current is negligible. As the shoe passes off the plate 32, this circuit closes, and the parts return to their normal positions, thereby opening contacts 40 and 41 and leaving the various parts of the system in their normal positions.

Plunger 109 is normally held elevated by latch 114, the same being held in normal position by its spring 118. The compression spring 112 tends to move the plunger downward, but, of course, this action only takes place when the latch 114 is released. Magnet 119 receives current from the battery 135 while the circuit in which said battery is located is closed, and while said magnet is energized it holds its armature 120 upward, but when the current in this circuit and through said magnet 119 is broken, the armature 120 is pulled downward, thereby striking the rear end of the trip 114 forcing the same downwardly and moving the upturned upward end from beneath the lug 113. This permits the spring 112 to act, thereby instantly moving the plunger 109 downward and as a result closing steam valve 107 and opening air valve 106. As the trip 114 is thus actuated the contacts 116 and 117 are opened, thereby opening the circuit to the white lamp and the same ceases to burn. The solenoid coil 110 when energized is of sufficient strength to overcome the spring 112 and thus by closing the switch 145 and establishing current through said solenoid coil, the plunger 109—the upper end of which forms the core of said solenoid—may be held up or pulled up after it has dropped, provided contacts 101 and 102 of the speed controlling device are closed, as they are under normal conditions. Thus the plunger 109 can be drawn upward electrically only when the speed control device is at rest or revolving at a slow rate of speed. As the plunger 109 drops, the steam in the locomotive is cut off and the air brakes are set. The engineer may now close hand switch 145 so that when the train has slowed down the plunger will be again elevated, thereby opening the steam valve and closing the air valve in order to permit the train to proceed.

As long as the train operates at slow speed, the plates 97 and 98 will not be elevated by the speed control device and consequently the contacts 101 and 102 controlling the solenoid circuit will remain closed. Under such conditions, the magnet 119 is receiving current and thus holds armature 120 up so that trip 114 is not affected. If for any reason the solenoid 110 becomes inoperative, the plunger 109 can be elevated by manually operating the hand lever 129. The key operated lock 126 permits the plunger to be locked in its elevated position, but even when so locked, the trip 114 will be actuated every time the circuit is broken through magnet 119. The notch 125 in the plunger 109 in which the bolt of the lock engages is of sufficient length to permit the plunger to drop a short distance when the latch 114 is released from the plunger and when this short vertical movement of said plunger takes place, the lug 122 causes the arm 123 to make contact with the point 124, thereby closing the circuit in which the lamp 156, recorder 147 and bell 148 are located, so that said recorder will record each time the brakes would have been set were the plunger not locked, and simultaneous with this action, bell 148 will ring and lamp 156 will be lighted.

As hereinbefore stated, the recorder 130 records each time contacts 77 and 78 are closed and which action takes place when the shoe containing the coils passes over the energized track magnets. The circuit in which the speed indicator 136 is located is controlled by contacts 99 and 100 and when said contacts are open, the pointer on said speed indicator is on the left hand side to indicate that the train is running at a comparatively slow or safe speed. When the speed control device is thrown into operation the contacts 99 and 100 are closed, thus causing the speed indicator hand to move to the right, thereby indicating high speed and the fact that the brakes will be set if the engine passes a semaphore arm set at danger. Armature 77, contact 90 and armature 161 are all in multiple and for this reason they control current to magnet 119. Hence, if any one of these three contact members is closed, magnet 119 will receive current, thereby holding its armature 120 up and as a result plunger 109 will not be affected or permitted to drop. Hence, to permit the plunger 109 to drop, all three of the contacts just mentioned must be open.

The contacts 116 and 117 control the circuit to the safety white lamp 158 and thus as long as these contacts are closed and while the trip 114 is in its normal position, said white lamp will burn, indicating that the parts are held in their normal or "safe" positions. Contacts 123 and 124 control the circuit in which recorder 147, red lamp 156 and bell 148 are located and when the plunger 109 has dropped, either partially or wholly, these contacts will be closed, thus making a record of the drop of said plunger and causing the lamp 156 to burn and the bell 148 to ring. Contacts 127 and 128 control the circuit in which lamp 159 is located and thus when the bolt of the lock 126 is moved to engage in the notch 125 to lock the plunger in its elevated position, contacts 127 and 128 are closed, thereby closing the circuit in which lamp 159 is located and causing the same to burn.

In Figs. 10 to 17, inclusive, I have shown a simplified arrangement of the various circuits as they appear under different conditions, and for the sake of convenience, I have placed the various pairs of contacts in line.

Figure 10:
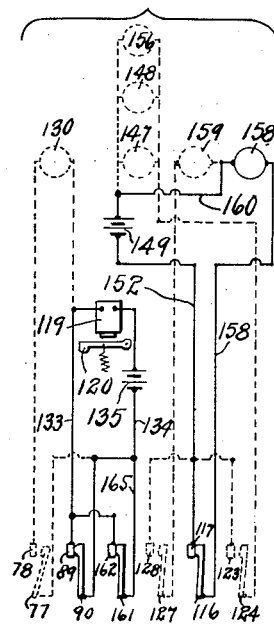

Fig. 10 shows the active circuits while the locomotive is at rest, as for instance at a station, but not upon a block rail. In this instance, contacts 77 and 78 are open while contacts 89 and 90 are closed. As the speed control is not operating, contacts 161 and 162 are closed and plunger 109 not being locked, contacts 127 and 128 are open. Contacts 89 and 90 and 161 and 162 being closed, magnet 119 gets current and contacts 116 and 117 are closed, and consequently, white lamp 158 burns to indicate "safety"

Figure 11:
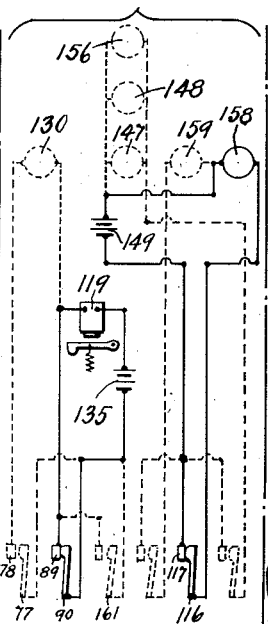

Fig. 11 shows conditions while the engine is running at normal speed, somewhere between block towers. Under these conditions, contacts 77 and 78 are open, contacts 89 and 90 closed and as the speed device is in operation, contacts 161 and 162 are open. Plunger 109 is not locked, thus contacts 127 and 128 are open. Contacts 89 and 90 being closed, magnet 119 gets current, so contacts 116 and 117 are closed and thus the white "safety" lamp 158 burns.

Figure 12:
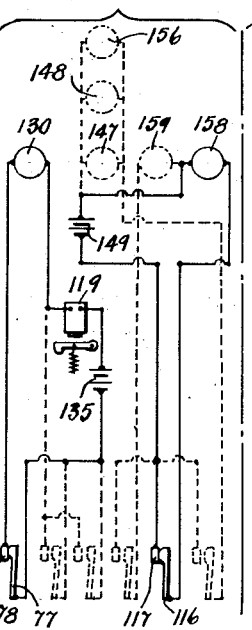

Fig. 12 illustrates conditions where an engine is running at speed past a block tower, the semaphore arm of which is set at "safe" and with the shoe passing over the track magnets. Current flowing through track magnets sets up induced current to relay coils 74 and 75, thereby holding contacts 77 and 78 closed. The lever comprising the jaws 86 and 87 is moved so that contacts 89 and 90 are open and the speed control device is operating to elevate the plate 98, thereby opening contacts 101 and 102 and closing contacts 99 and 100. The bolt of lock 126 is not shifted, consequently contacts 127 and 128 are open. Magnet 119 gets current from the battery 135 so armature 120 is attracted, leaving trip 114 in its normal condition with contacts 116 and 117 closed and contacts 123 and 124 open. Thus the white lamp 158 burns to indicate "safety".

Figure 13:
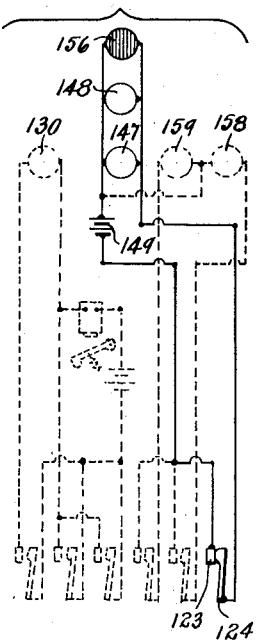

Fig. 13 illustrates conditions where an engine is running at speed past a block tower whose semaphore arm is set at "danger". Under such conditions, there is no current flowing through track magnets so that contacts 77 and 78 are open and when the lever comprising the jaws 86 and 87 passes over the rail section 24, contacts 89 and 90 are open. The speed control device is operating to close contacts 99 and 100 and as the bolt of lock 126 is not thrown, contacts 127 and 128 are open. Magnet 119 receives no current so armature 120 is pulled downward, actuating trip 114 and opening contacts 116 and 117. As said plunger falls, contacts 123 and 124 are closed and as a result the circuits in which bell 148, recorder 147 and light 156 are located are closed, thereby recording the drop of the plunger, ringing the bell and causing the red lamp to burn and simultaneously as the pluger drops the steam is shut off and the air brake valve is open to set the brakes.

Figure 14:
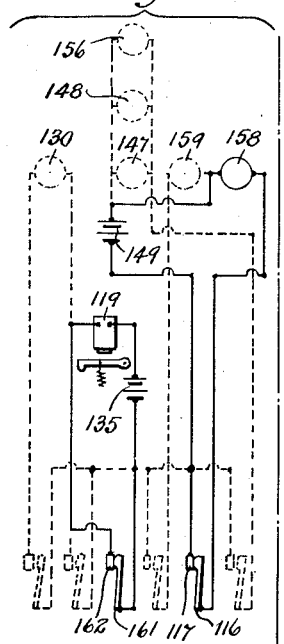

Fig. 14 illustrates conditions where an engine is running slowly past a block tower whose semaphore is set at "danger". There is no current through the track magnets so contacts 77 and 78 are open and the lever comprising the jaws 86 and 87 when moved opens contacts 89 and 90. The speed control is not operating, due to the slow movement of the train, consequently contacts 101 and 102 remain closed and contacts 99 and 100 are open. As the bolt of lock 129 is not shifted to lock the plunger, contacts 127 and 128 are open and as magnet 119 is receiving current to hold its armature up, contacts 116 and 117 are closed and contacts 123 and 124 open and "safety" lamp 158 burns.

Figure 15:
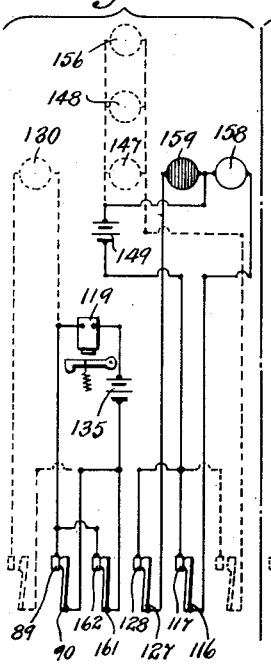
Figure 16:
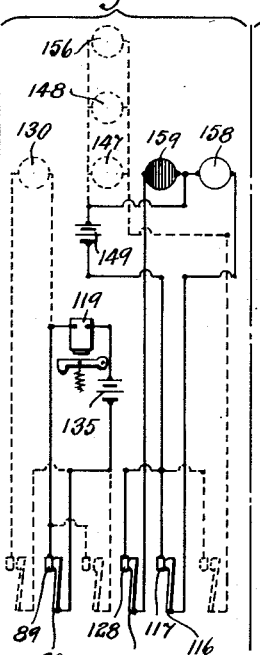
Figure 17:
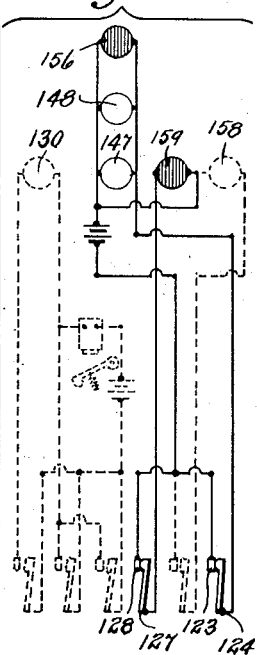

Figs. 15, 16 and 17 illustrate conditions for the second engine of a double header, that is two engines to one train. In all three cases, the plunger 109 is locked in its elevated position by an actuation of the bolt of lock 126 but the plunger on the first engine is not locked. This arrangement provides for the operation of all the warning and indicating devices on the second engine, but its brakes will not be set. Fig. 15 shows conditions on the second engine of a double header with the plunger locked and the train standing still, as at a station, and when the bolt of the lock is actuated, contacts 127 and 128 are closed so that lamp 159 burns continuously. Fig. 16 illustrates conditions on the second engine of a double header with the plunger locked and said engine running at speed somewhere between block towers. Fig. 17 illustrates conditions where the engine of a double header is running at speed past a block tower whose semaphore is set at danger and with the plunger 109 locked in its elevated position.

My improved system is adapted for use on open railways, bridges, elevated structures, tunnels and subways and where either steam or electricity is utilized as propelling power. The system will operate under all weather conditions that permit the operation of trains, conforms to the recognized standards of clearance of rolling equipment and structures and the accidental destruction of any of the essential parts of the apparatus will open a circuit at the time it should be closed, thereby automatically setting the brakes. The failure of the current to flow through the track magnets for any reason when the engine is opposite said magnets, will give a warning signal and the brakes will be set (provided the plunger has not been locked), and the brakes once set cannot be released until the train has been brought to a stop or has been materially reduced in speed. Should operative conditions require, the speed control may be utilized to permit a train to pass a danger point at a predetermined slow rate of speed. Where no cause for stopping a train exists, a definite and positive "clear" or safe signal is shown by the burning of the white lamp 158 and by the hand of the block recorder 130 at such points as where brakes would be applied if danger existed. When the brakes have been automatically set and the speed of the train has been reduced or said train has been stopped, the engineer may, from his position in the cab, readily restore the plunger to its normal position to permit the train to proceed. The engineer by noting the speed indicator is at all times aware of whether or not the speed of the locomotive is sufficiently low to permit the passage of a point where, if the speed were high, the brakes would be set.

It will be readily understood that various modifications and slight structural changes may be resorted to in the construction of the various parts of my improved system without departing from the spirit of my invention, the scope of which is set forth in the appended claims.

I claim:

1. In a train controlling and stopping system the combination with a railway track divided into blocks and each block equipped with an electrically operated semaphore, of a series of magnets located adjacent one of the rails of each block of the track, a source of electrical energy for said magnets, a circuit in which said magnets and the source of electrical energy are located, which circuit is normally closed at one point when the semaphore of the next adjacent block is in a position to indicate safety and open when said adjacent block is occupied by a train, a polarized relay having its armature in circuit with the series of magnets and their source of electrical energy, a circuit and a source of electrical energy for said polarized relay, contacts in said last mentioned circuit which are adapted to be closed by means carried by the locomotive operating on the track, a shoe carried by the locomotive and adapted to pass over the track magnets, a series of coils in said shoe, which coils receive an induced current from the track magnets when current is flowing therethrough, a relay in circuit with the coils of the shoe, and electrically controlled means for actuating the air and steam valves of the locomotive, which last mentioned means is controlled by the relay which is in circuit with the coils of the shoe.

2. In a train controlling and stopping system the combination with a railway track divided into blocks and each block equipped with an electrically operated semaphore, of a series of magnets located adjacent one of the rails of each block of the track, a source of electrical energy for said magnets, a circuit in which said magnets and the source of electrical energy are located, which circuit is normally closed at one point when the semaphore of the next adjacent block is in a position to indicate safety and open when said adjacent block is occupied by a train, a polarized relay having its armature in circuit with the series of magnets and their source of electrical energy, a circuit and a source of electrical energy for said polarized relay, contacts in said last mentioned circuit, which are adapted to be closed by means carried by the locomotive operating on the track, a shoe carried by the locomotive and adapted to pass over the track magnets, a series of coils in said shoe, which coils receive an induced current from the track magnets when current is flowing therethrough, a relay in circuit with the coils of the shoe, electrically controlled means for actuating the air and steam valves of the locomotive, which last mentioned means is controlled by the relay which is in circuit with the coils of the shoe, and a series of electrically operated recording and signaling devices carried by the locomotive, the same being controlled by the action of the relay and said electrically controlled means.

3. In a train controlling and stopping system the combination with a railway track divided into blocks and each block equipped with an electrically operated semaphore, of a series of magnets located adjacent one of the rails of each block of the track, a source of electrical energy for said magnets, a circuit in which said magnets and the source of electrical energy are located, which circuit is normally closed at one point when the semaphore of the next adjacent block is in a position to indicate safety and open when said adjacent block is occupied by a train, a polarized relay having its armature in circuit with the series of magnets and their source of electrical energy, a circuit and a source of electrical energy for said polarized relay, contacts in said last mentioned circuit, which are adapted to be closed by means carried by the locomotive operating on the track, a shoe carried by the locomotive and adapted to pass over the track magnets, a series of coils in said shoe, which coils receive an induced current from the track magnets when current is flowing therethrough, a relay in circuit with the coils of the shoe, electrically controlled means for actuating the air and steam valves of the locomotive, which last mentioned means is controlled by the relay which is in circuit with the coils of the shoe, and a centrifugal speed control device on the locomotive for controlling the action of the electrically controlled means associated with the air and steam valves.

4. In a train controlling and stopping system the combination with a railway track divided into blocks, each of which is equipped with an electrically operated signal, of a series of magnets located adjacent to one of the rails of each block of the track, a source of electrical energy in circuit with said magnets, which circuit is opened at one point when the adjacent block is occupied by a train, a shoe carried by the locomotive of the train operating on the railway track, which shoe is adapted to pass over the magnets located adjacent to the track, means actuated by said shoe for completely closing said circuit to energize the track magnets when the adjacent block is unoccupied, a series of coils carried by the shoe, which coils receive an induced current from the track magnets when the same are energized, and electrically controlled means for actuating the air and steam valves of the locomotive, which last mentioned means is controlled by the induced current in the coils of the shoe.

5. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, and electrically operated means controlled by said last mentioned relay for actuating said latch.

6. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, and means for locking the plunger in its set position.

7. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, means for locking the plunger in its set position, and an electrically operated signal controlled by the plunger locking means for indicating the locking of said plunger.

8. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, means for locking the plunger in its set position, and an electrically operated recording device controlled by the downward movement of the plunger for recording each downward movement thereof.

9. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, and an electrically operated signaling device controlled by the latch for indicating that said latch is in its normal position and in engagement with the plunger.

10. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, and a centrifugal speed controlled device located on the locomotive and adapted under high speed to automatically open the circuit in which the last mentioned electrically operated means is located, thereby actuating the latch to release the plunger.

11. In a train controlling and stopping system the combination with a railway track divided into blocks and each block equipped with an electrically operated signal, of a series of magnets located adjacent one of the rails of each block of the track, a source of electrical energy in circuit with said magnets, said circuit being normally closed at one point when the signal of the next adjacent block is in a position to indicate safety and open when said adjacent block is occupied by a train, a polarized relay having its armature in circuit with the series of magnets and their source of electrical energy, a circuit and a source of electrical energy for said polarized relay, a shoe carried by a locomotive operating on the track, which shoe is adapted to pass over the track magnets, a series of coils in said shoe, which coils receive an induced current from the track magnets when current is flowing therethrough, a relay in circuit with the coils of the shoe, a plunger operatively associated with and adapted to actuate the steam and air valves of the locomotive, a latch for holding said plunger in set position, electrically operated means controlled by said last mentioned relay for actuating said latch, a centrifugal speed controlled device located on the locomotive and adapted under high speed to automatically open the circuit in which the last mentioned electrically operated means is located, thereby actuating the latch to release the plunger, and an electrical recorder for recording the operations of the centrifugal speed controlled device.

12. In a train controlling and stopping system the combination with the steam and air valves on a locomotive, of a plunger connected to said valves and adapted to close the same, a latch for normally holding the plunger elevated, an electrically controlled means for actuating said latch to release the plunger, a solenoid coil inclosing the upper end of said plunger, a source of electrical energy in circuit with said coil, contacts in the circuit in which said solenoid coil is located, a centrifugal speed governor mounted on one of the locomotive axles for controlling said contacts, and a switch in said circuit, which switch when closed permits current flow through the solenoid to normally hold the plunger elevated or to raise the same after downward movement.

13. In a train controlling and stopping system the combination with the steam and air valves on a locomotive, of a plunger connected to said valves and adapted to close the same, a latch for normally holding the plunger elevated, an electrically controlled means for actuating said latch to release the plunger, a solenoid coil inclosing the upper end of said plunger, a source of electrical energy in circuit with said coil contacts in the circuit in which said solenoid coil is located, a centrifugal speed governor mounted on one of the locomotive axles for controlling said contacts, a switch located in the circuit with the contacts, which switch when closed permits current flow through the solenoid to hold the plunger elevated or to raise the same after downward movement, and a series of electrically operated recording and signaling devices which are thrown into operation whenever the speed governor is thrown into operation.

14. In a train controlling and stopping system the combination with the air and steam valves on a locomotive, of a plunger adapted to operate said valves, a latch for holding said plunger normally elevated, a relay for actuating said latch, a normally closed circuit in which said relay is located, a second circuit, a relay therein, which relay is adapted to open contacts in the first mentioned circuit, said second mentioned circuit being normally open, and a centrifugal speed control device located on the axle of the locomotive and adapted under action to close the contacts in said second mentioned circuit.

15. In a train controlling and stopping system the combination with the air and steam valves on a locomotive, of a plunger adapted to operate said valves, a latch for holding said plunger normally elevated, a relay for actuating said latch, a normally closed circuit in which said relay is located, a second circuit, a relay therein, which relay is adapted to open contacts in the first mentioned circuit, said second mentioned circuit being normally open, a centrifugal speed control device located on the axle of the locomotive, and adapted under action to close the contacts in said second mentioned circuit, and a recorder located in the second mentioned circuit for recording the operations of the centrifugal speed control device.

In testimony whereof I hereunto affix my signature in the presence of two witnesses, this 24th day of May, 1913.

GEORGE R. GUILD.

Witnesses:
M. P. SMITH,
M. A. HANDEL.